United States Patent
Carney et al.

(10) Patent No.: US 9,806,982 B2
(45) Date of Patent: Oct. 31, 2017

(54) ROUTER POLICY SYSTEM

(75) Inventors: Mark D. Carney, Sterling, VA (US);
Harold J. Schiller, Silver Spring, MD (US); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1127 days.

(21) Appl. No.: 12/978,938

(22) Filed: Dec. 27, 2010

(65) Prior Publication Data
US 2012/0167160 A1 Jun. 28, 2012

(51) Int. Cl.
*H04L 12/751* (2013.01)
*H04L 12/755* (2013.01)
*H04L 29/06* (2006.01)

(52) U.S. Cl.
CPC ............ *H04L 45/02* (2013.01); *H04L 45/021* (2013.01); *H04L 45/025* (2013.01); *H04L 63/10* (2013.01); *H04L 63/105* (2013.01)

(58) Field of Classification Search
CPC ..... H04L 45/00; H04L 45/50; H04L 12/5689; H04L 45/02; H04L 45/021; H04L 45/025; H04L 63/10; H04L 63/105; H04L 12/56
USPC ................................. 726/1; 709/238; 370/351
See application file for complete search history.

(56) References Cited

U.S. PATENT DOCUMENTS

| | | | |
|---|---|---|---|
| 6,341,127 B1* | 1/2002 | Katsube | H04L 45/50 370/230 |
| 2008/0013551 A1* | 1/2008 | Scholl | 370/401 |
| 2008/0112410 A1* | 5/2008 | Wood | H04L 45/00 370/392 |
| 2008/0307516 A1* | 12/2008 | Levy-Abegnoli | H04L 45/00 726/9 |

* cited by examiner

*Primary Examiner* — Kambiz Zand
*Assistant Examiner* — Ayoub Alata

(57) ABSTRACT

A router policy server may include a policy engine. The policy engine may receive, from a first router, a request for whether to accept or reject routing information received from a second router and determine whether a policy, associated with the second router, allows the second router to advertise the routing information. The policy engine may further instruct the first router to accept the routing information when the policy allows the second router to advertise the routing information and may instruct the first router to reject the routing information when the policy does not allow the second router to advertise the routing information or when no policy exists for the second router in association with the policy engine.

20 Claims, 13 Drawing Sheets

ROUTER POLICY SYSTEM

BACKGROUND INFORMATION

Communication networks may include network nodes connected to each other through network links. When a source device transmits data to a destination device, the data may need to traverse through one or more network nodes to reach the destination device. The data may include a destination address associated with the destination device. At each network node through which the data travels, a decision may need to be made about a next hop destination network node to which the data should be sent, based on the destination address. Routing algorithms may be used to compute the best next hop destination, based on, for example, path costs associated with network links. As network links may change over time, network nodes may need to periodically exchange routing information associated with network links and may need to re-compute the best next hop destinations for particular destination addresses. However, exchange of routing information between network nodes may raise concerns about network security.

DETAILED DESCRIPTION OF PREFERRED EMBODIMENTS

Figure 1:
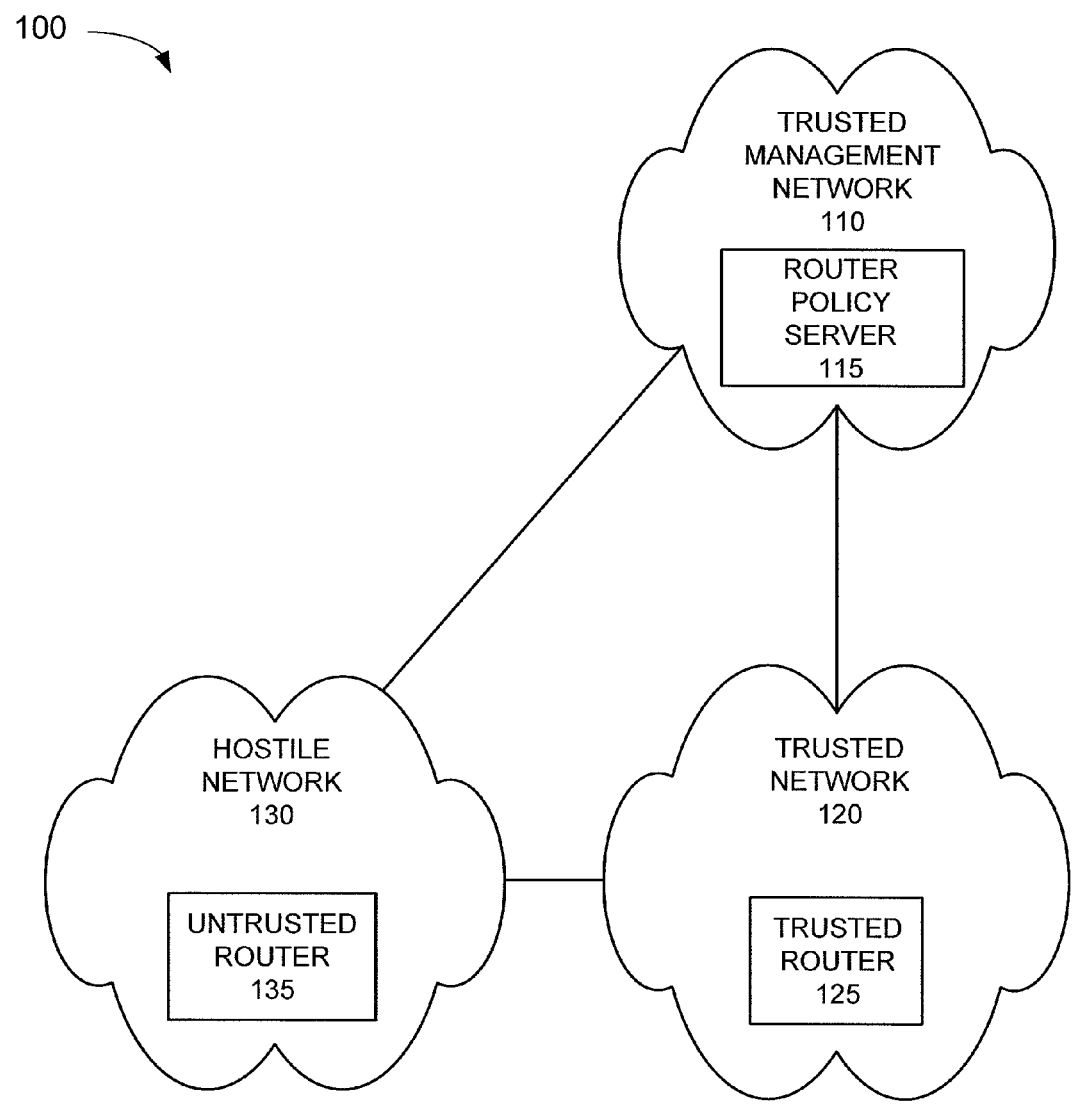
FIG. 1 is a diagram illustrating an example of components of a system according to an implementation described herein.

The following detailed description refers to the accompanying drawings. The same reference numbers in different drawings identify the same or similar elements. Also, the following detailed description does not limit the invention.

An implementation described herein may relate to a router authorization system that manages exchanges of routing information in a network and between the network and another network. For example, one or more router policy servers may manage which routing information messages (e.g., link state advertisements) should be accepted by a router and what routing information may be transmitted by the router. When a first router in a trusted network receives an advertised route from a second router, the first router may contact a router policy server to determine whether to accept the advertised route. The router policy server may determine a policy associated with the second router and may instruct the first router whether to accept or reject the advertised route based on the policy associated with the second router. Furthermore, the first router may be set up to provide routing information to the router policy server, rather than broadcasting the routing information to its neighbors. The router policy server may manage a routing table for a network, may determine which routers are to receive routing information based on a policy associated with each router, and may provide the routing information to the other routers based on the determined policy. If a particular router requests a routing update from the router policy server, the router policy server may determine a policy associated with the particular router, and provide the routing update based on the policy. For example, an edge router from a hostile network associated with a nonexistent or low trust level may only receive routes from a trusted network that directly connect to the edge router, rather than receiving a more detailed topology of the trusted network.

Moreover, the router policy server may manage policies associated with multi-protocol label switching (MPLS) packets. For example, the router policy server may determine which particular routers are allowed to send and/or receive packets associated with a particular MPLS label; and/or which particular routers are not allowed to send and/or receive packets associated with the particular MPLS label.

In one implementation, the router policy server may centrally control the flow of routing information in the network and between the network and another network. In another implementation, the router policy server may push a local policy down to a particular router. The local policy may allow the router to make particular kinds of decisions regarding the flow of routing information to and from the router, without having to consult the router policy server.

In yet another implementation, the router policy server may provide one or more digitally signed messages to a router. The router may use the received one or more digitally signed messages to authenticate messages that include routing information, when sending or receiving messages that include routing information to or from other routers, or to or from the router policy server.

FIG. 1 is a diagram of a system 100 according to an implementation described herein. As shown in FIG. 1, system 100 may include a trusted management network 110, a trusted network 120, and a hostile network 130.

Trusted management network 110, trusted network 120, and/or hostile network 130 may each include a circuit-switched network and/or a packet-switched network and may enable components of system 100 to communicate with each other. A "packet" may refer to a packet, a datagram, or a cell; a fragment of a packet, a fragment of a datagram, or a fragment of a cell; or another type, arrangement, or packaging of data. Trusted management network 110, trusted network 120, and/or hostile network 130 may include one or more of a local area network (LAN), a wide area network (WAN), a metropolitan area network (MAN), a wireless network (e.g., a Code Division Multiple Access (CDMA) network, a general packet radio service (GPRS) network, and/or a Long Term Evolution (LTE) network), an ad hoc network, a public switched telephone network (PSTN), a subset of the Internet, any other network, or any combination thereof. In one implementation, each of trusted management network 110, trusted network 120, and hostile network 130 may correspond to autonomous system (AS) networks communicating via one or more inter-network protocols, such as the Border Gateway Protocol (BGP). In another implementation, one or more of trusted management network 110, trusted network 120, or hostile network 130 may not correspond to distinct AS networks. For example, trusted management network 110 and trusted network 120 may be part of a same AS network.

Trusted management network 110 may include a network that includes one or more network nodes that manage exchanges of routing information between network nodes of another network, such as trusted network 120. Trusted management network 110 may include one or more router policy servers 115 (referred to herein collectively as "router policy servers 115" and individually as "router policy server 115").

Trusted network 120 may include a network that includes one or more network nodes that exchange routing information based on authorizations granted by network nodes in trusted management network 110. Trusted network 120 may include one or more trusted routers 125 (referred to herein collectively as "trusted routers 125" and individually as "trusted router 125"). Trusted router 125 may include any network node capable of performing routing functions. For example, trusted router 125 may include a layer 3 device based on the 7 layer Open Systems Interconnection (OSI) model. Router policy server 115 may store a trust level in association with trusted router 125.

Hostile network 130 may include a network that includes one or more network nodes that are not authorized, by trusted management network 110, to exchange routing information with network nodes in trusted network 120 and/or that may be associated with an organization designated as hostile with respect to the security of trusted network 120. For example, trusted management network 110 and trusted network 120 may be associated with a first country and hostile network 130 may be associated with a second country, where the first country and the second country have a hostile relationship with respect to network security. Hostile network 130 may include one or more untrusted routers 135 (referred to herein collectively as "untrusted routers 135" and individually as "untrusted router 135"). Untrusted router 135 may include any network node capable of performing routing functions. For example, untrusted router 135 may include a layer 3 device based on the 7 layer OSI model. Router policy server 115 may not include a stored policy or a trust level in association with untrusted router 135. Thus, in one implementation, trusted router 125 may be located in, or associated with, a first country and untrusted router 135 may be located in, or associated with, a second country. In another implementation, trusted router 125 and untrusted router 135 may both be located in, or associated with, the same country.

Router policy server 115 may include one or more devices that may monitor the exchange of routing information between trusted routers 125 of trusted network 120 and/or that may monitor the exchange of routing information between trusted router 125 of trusted network 120 and untrusted router 135 of hostile network 130. For example, router policy server 115 may instruct trusted router 125 to reject an advertised route from untrusted router 135.

Router policy server 115 may also manage a routing table for trusted network 120 and may selectively provide information about the routing table to trusted router 125 and/or untrusted router 135. For example, router policy server 115 may provide only partial information from the routing table to untrusted router 135 based on router policy server 115 not having a record of a policy associated with untrusted router 135. On the other hand, router policy server 115 may provide a whole routing table (or at least more information than is provided to untrusted router 135) to trusted router 125 based on a trust level associated with trusted router 125.

Furthermore, router policy server 115 may receive routing information from trusted router 125 (and/or another router policy server 115) and adjust a routing table based on the received routing information and based on a policy associated with trusted router 125 (and/or the other router policy server 115). On the other hand, router policy server 115 may receive routing information from untrusted router 135 and may not automatically accept the routing information as valid based on the fact that untrusted router 135 is not associated with a policy. Router policy server 115 may furthermore analyze the routing information received from untrusted router 135 to determine whether the received routing information is valid.

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100. For example, in another implementation (not shown in FIG. 1, trusted router 125 and untrusted router 135 may be part of a same network that includes a trusted environment, including trusted router 125, and a hostile (e.g., physically insecure) environment, including untrusted router 135.

Figure 2:
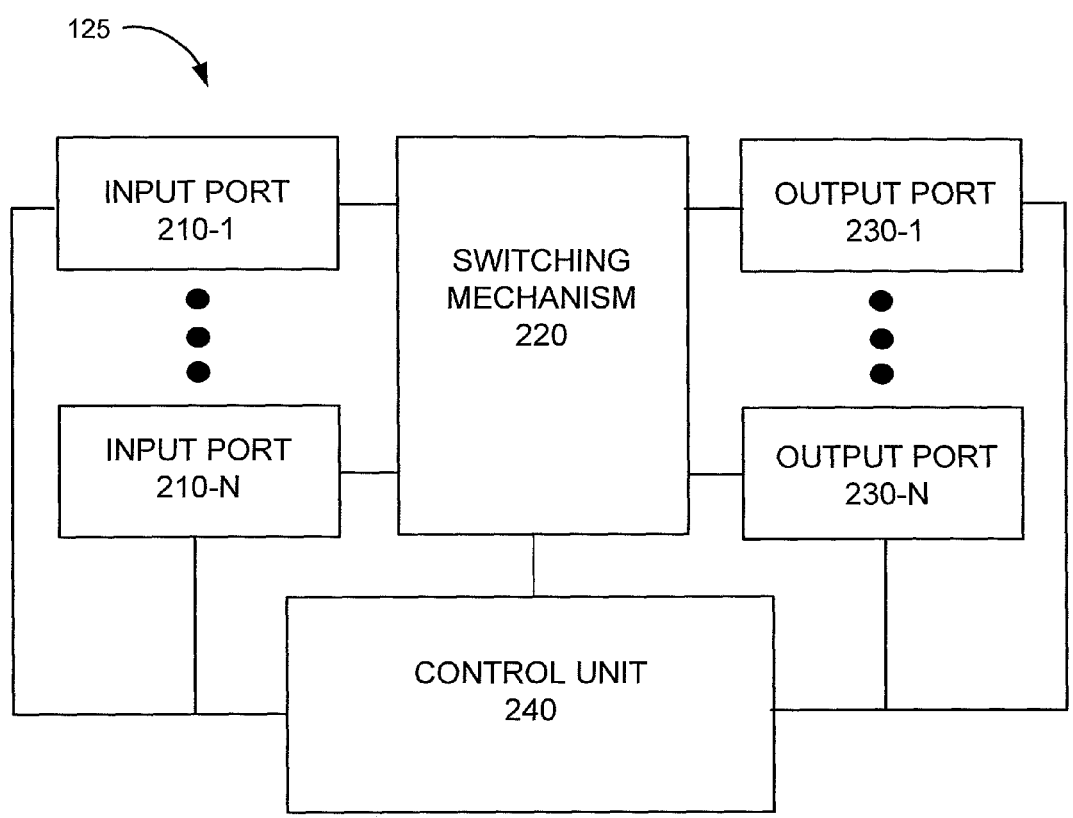
FIG. 2 is a diagram illustrating example components of a router according to an implementation described herein.

FIG. 2 is a diagram illustrating example components of trusted router 125 of the system of FIG. 1 according to an implementation described herein. Untrusted router 135 may be similarly configured. As shown in FIG. 2, trusted router 125 may include one or more input ports 210-1 to 210-N (referred to herein individually as "input port 210" and collectively as "input ports 210"), a switching mechanism 220, one or more output ports 230-1 to 230-N (referred to herein individually as "output port 230" and collectively as "output ports 230"), and/or a control unit 240.

Input ports 210 may be the points of attachments for physical links and may be the points of entry for incoming traffic. An input port 210 may be associated with an interface card (not shown in FIG. 2). Switching mechanism 220 may include one or more switching planes to facilitate communication between input ports 210 and output ports 230. In one implementation, each of the switching planes may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. Output port 230 may be associated with an interface card (not shown in FIG. 1). Control unit 240 may interconnect with input ports 210, switching mechanism 220, and/or output ports 230 and may perform control plane operations associated with trusted router 125. For example, control unit 240 may use routing protocols and may create a forwarding table that is used in traffic forwarding.

Although FIG. 2 shows example components of trusted router 125, in other implementations, trusted router 125 may include fewer components, different components, differently arranged components, and/or additional components than depicted in FIG. 2. Additionally or alternatively, one or more components of trusted router 125 may perform one or more tasks described as being performed by one or more other components of trusted router 125.

Figure 3:
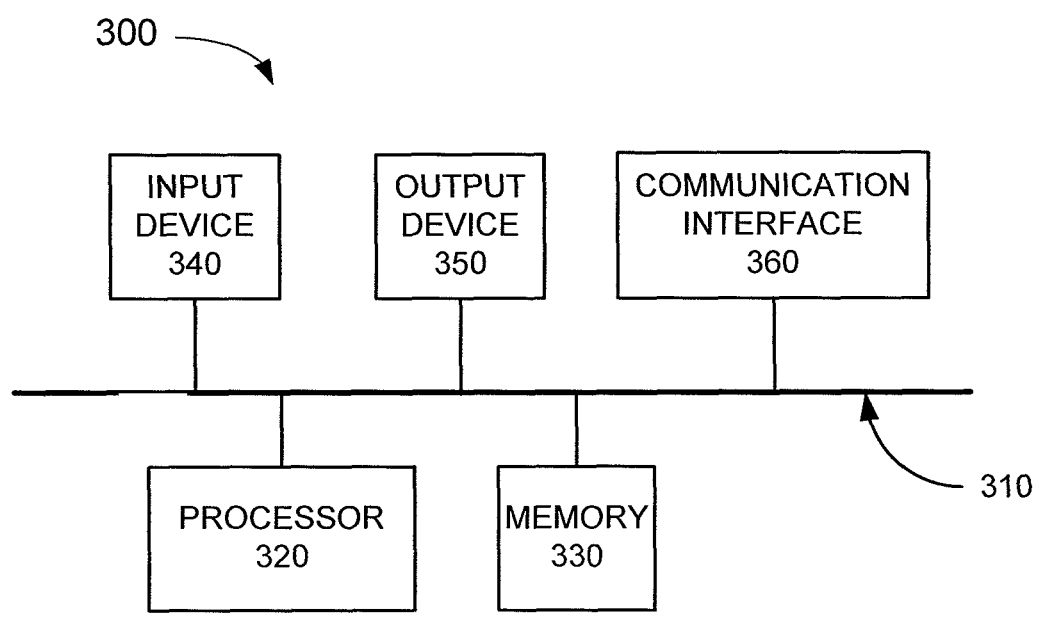
FIG. 3 is a diagram illustrating example components of a router policy server or of a control module of a router according to an implementation described herein.

FIG. 3 is a diagram illustrating example components of a device 300 according to a first implementation described herein. Device 300 may correspond to router policy server 115 or to control unit 240 of trusted router 125. As shown in FIG. 3, device 300 may include a bus 310, a processor 320, a memory 330, an input device 340, an output device 350, and a communication interface 360.

Bus 310 may include a path that permits communication among the components of device 300. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to device 300, such as a keypad, a keyboard, a button, or an input jack for an input device such as a keypad or a keyboard, etc. Output device 350 may include a mechanism that outputs information to the operator, including one or more light indicators, a display, a speaker, etc.

Communication interface 360 may include any transceiver-like mechanism that enables device 300 to communicate with other devices and/or systems. For example, communication interface 360 may include a modem, a network interface card, and/or a wireless interface card.

As will be described in detail below, device 300 may perform certain operations. Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4A:
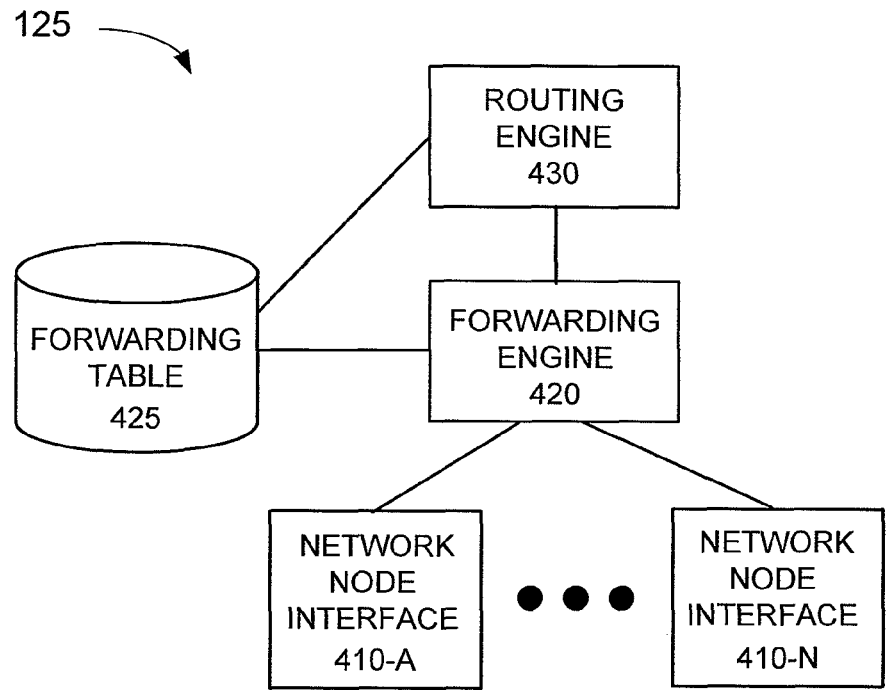
FIG. 4A is a diagram of example functional components of a router according to an implementation described herein.

FIG. 4A is a diagram of example functional components of trusted router 125 according to an implementation described herein. Untrusted router 135 may be similarly configured. As shown in FIG. 4A, trusted router 125 may include one or more network interfaces 410-A to 410-N (referred to herein collectively as "network interfaces 410" and individually as "network interface 410"), a forwarding engine 420, a forwarding table 425, and a routing engine 430.

Network interface 410 may communicate with one or more remote interfaces located in one or more remote network nodes (e.g., another trusted router 125 or untrusted router 135). For example, network interface 410 may send packets to a remote interface and/or receive packets from the remote interface. Network interface 410 may be associated with one or more logical or physical ports (e.g., input ports 210 and/or output ports 230). A logical port may include functionality associated with a single physical port or may include functionality spread across multiple physical ports. Furthermore, a single physical port may be associated with multiple logical ports.

Forwarding engine 420 may look up a next hop destination address of incoming traffic (e.g., any type or form of data, such as packet or non-packet data) in forwarding table 425 to determine its destination port (i.e., route lookup); may classify traffic into particular Quality of Service (QoS) classes; and/or may run datalink-level protocols and/or network-level protocols. If forwarding engine 420 cannot identify a next hop destination address in forwarding table 425, forwarding engine 420 may consult routing engine 430.

Forwarding table 425 may store a forwarding table that relates a particular destination address to a particular next hop destination.

Routing engine 430 may include control plane processing and/or management plane processing functionality. Example functional components of routing engine 430 are described below with reference to FIG. 4B.

Although FIG. 4A shows example functional components of trusted router 125, in other implementations, trusted router 125 may include fewer functional components, different functional components, differently arranged functional components, or additional functional components than depicted in FIG. 4A. Additionally or alternatively, one or more functional components of trusted router 125 may perform one or more tasks described as being performed by one or more other functional components of trusted router 125.

Figure 4B:
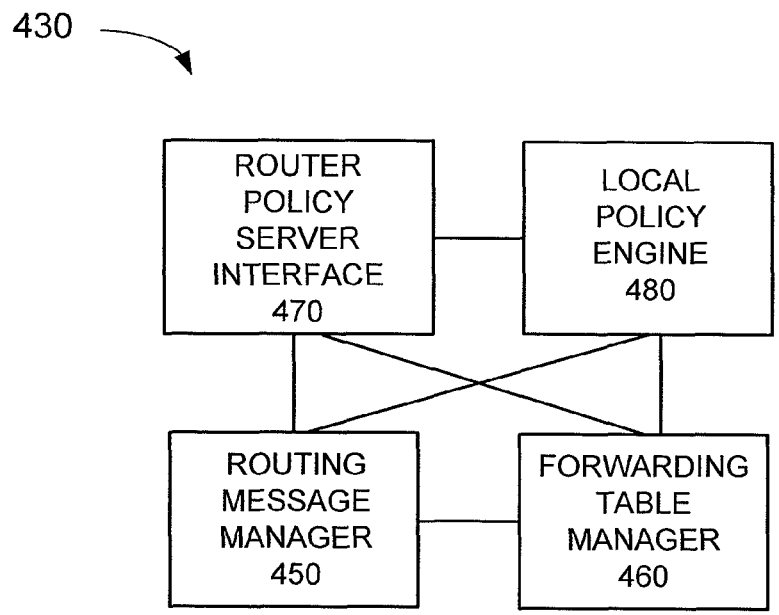
FIG. 4B is a diagram of example functional components of a routing engine according to an implementation described herein.

FIG. 4B is a diagram of example functional components of routing engine 430 according to an implementation described herein. As shown in FIG. 4B, routing engine 430 may include a routing message manager 450, a forwarding table manager 460, a router policy server interface 470, and a local policy engine 480.

Routing message manager 450 may receive messages that include routing information from other routers (e.g., from another trusted router 125 or from untrusted router 135) and may send messages that include routing information to the other routers. A message sent or received by routing message manager 450 may include, for example, information about a change in an interface state associated with a particular network node; a change in a link between two network nodes (e.g., a new network link or loss of an existing network link); a keep-alive message indicating a health of an interface associated with a neighboring network node; summary routing information about a particular sub-network, stub area, or border area; a route advertisement that may be opaque to routing message manager 450 but that may need to be transmitted to another network node; and/or traffic engineering information associated with a particular network link. Routing message manager 450 may also receive a packet associated with a particular MPLS label and may determine how to process the packet based on the particular MPLS label.

In one implementation, routing message manager 450 may, in response to receiving routing information from another router, forward the routing information to router policy server interface 470 for a determination on how to process the routing information. Additionally or alternatively, routing message manager 450 may, in response to receiving routing information from another router, forward the routing information to local policy engine 480 for a determination on how to process the routing information. Additionally or alternatively, routing message manager 450 may, in response to receiving routing information from another router, determine whether the routing information includes a valid key and may accept or reject the routing information based on whether the routing information includes the valid key.

Forwarding table manager 460 may receive routing information from routing message manager 450 and may update forwarding table 425 based on the received routing information.

Router policy server interface 470 may communicate with router policy server 115. For example, router policy server interface 470 may receive routing information from routing message manager 450, may transform the routing information into a format compatible with router policy server 115, and may transmit the transformed routing information to router policy server 115. Router policy server interface 470 may also receive instructions and/or routing information from router policy server 115, may transform the instructions and/or routing information from a format used by router policy server 115 to a format used by trusted router 125, and may forward the transformed instructions and/or routing information to routing message manager 450, to local policy engine 480, and/or to forwarding table manager 460.

Local policy engine 480 may receive a local policy from router policy server 115 and may use the local policy in determining how to process routing information and/or how to process packets associated with MPLS labels. For example, local policy engine 480 may determine whether to accept or reject particular routing information received by routing message manager 450 based on a policy received from local policy engine 480. As another example, if trusted router 125 detects a change in a route or another change that may need to be advertised, local policy engine 480 may determine how to advertise the route. For example, local policy engine 480 may determine whether to advertise the route to all neighbors, a particular subset of neighbors, or whether to send information about the route to router policy server 115.

Although FIG. 4B shows example functional components of routing engine 430, in other implementations, routing engine 430 may include fewer functional components, different functional components, differently arranged functional components, or additional functional components than depicted in FIG. 4B. Additionally or alternatively, one or more functional components of routing engine 430 may perform one or more tasks described as being performed by one or more other functional components of routing engine 430.

Figure 5:
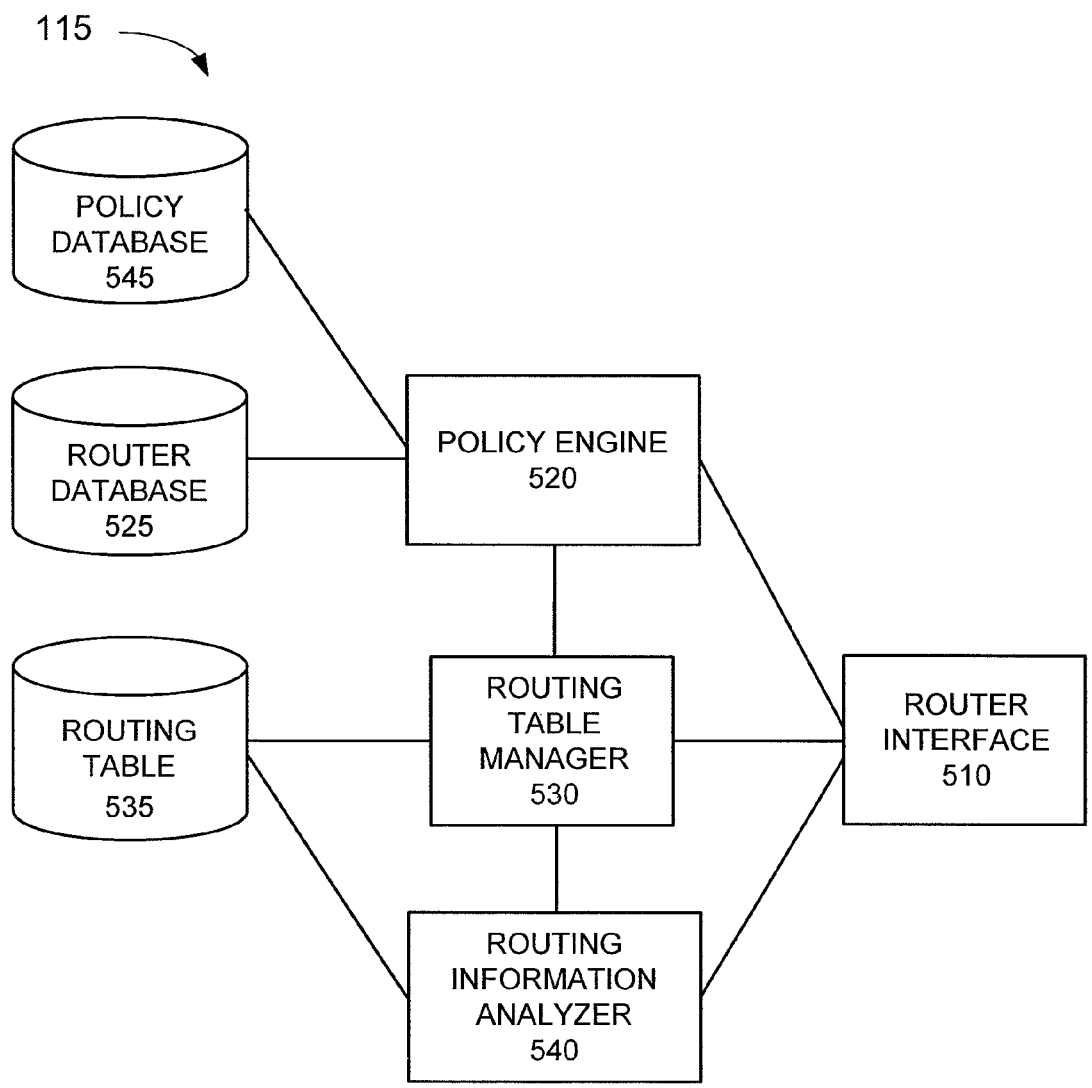
FIG. 5 is a diagram of example functional components of a router policy server according to an implementation described herein.

FIG. 5 is a diagram of example functional components of router policy server 115 according to an implementation described herein. As shown in FIG. 5, router policy server 115 may include a router interface 510, a policy engine 520, a router database 525, a routing table manager 530, a routing table 535, a routing information analyzer 540, and a policy database 545.

Router interface 510 may send and receive messages between router policy server 115 and a network node (e.g., trusted router 125 or untrusted router 135). For example, router interface 510 may receive a message from trusted router 125 (or from untrusted router 135), transform the message into a format compatible with router policy server 115, and forward the transformed message to policy engine 520, routing table manager 530, and/or routing information analyzer 550. Router interface 510 may also receive a message from policy engine 520, routing table manager 530, and/or routing information analyzer 550, transform the message into a format compatible with trusted router 125 (or untrusted router 135), and forward the transformed message to trusted router 125 (or untrusted router 135).

Policy engine 520 may make policy decisions about messages that include routing information exchanged in trusted network 120 or between trusted network 120 and untrusted network 130. For example, policy engine 520 may identify a policy associated with a router, from which routing information was received, and may determine how to process the routing information based on the determined policy. For example, if the routing information was received from trusted router 125, the routing information may be accepted and forwarded to routing table manager 530 to update routing table 535. As another example, if the routing information was received from untrusted router 135, the routing information may be rejected.

In one implementation, policy engine 520 may exercise central control over the flow of routing information and/or the flow of MPLS packets within trusted network 120 and between trusted network 120 and hostile network 130. Additionally or alternatively, policy engine 520 may push a local policy down to a particular trusted router 125. Additionally or alternatively, policy engine 520 may provide a key to trusted router 125 to use when sending or receiving messages that include routing information. Additionally or alternatively, when sending data (routing instructions, policy details, etc.) to trusted router 125 (or to untrusted router 135), policy engine 520 may also include a digital signature, hash, or other form of authenticator to provide verification along with the data.

Router database 525 may store information associated with particular trusted routers 125. Example fields that may be stored in router database 525 are described below with reference to FIG. 6A.

Routing table manager 530 may manage routing table 535. For example, routing table manager 530 may receive routing information from router interface 510 and may update routing table 535 based on the received information. Routing table 535 may store a routing table for trusted network 120 and/or additional networks (e.g., hostile network 130). Routing table 535 may store multiple routing tables and/or different types of routing tables. For example, routing table 535 may store an IP-based routing table and a BGP-based routing table.

Routing information analyzer 540 may receive routing information from untrusted router 135 (or trusted router 125) and may analyze the received routing information to determine whether the received routing information is valid. For example, in one implementation, routing information analyzer 540 may compare the received routing information with information in routing table 535 to determine whether the received routing information is consistent with information in routing table 535. Additionally or alternatively, routing information analyzer 540 may determine whether the received routing information is valid using another technique. Additionally or alternatively, routing information analyzer 540 may reject interface status updates appearing to be from trusted router 125 (and/or untrusted router 135) if the interface status updates are not signed with a respective private key associated with trusted router 125 (and/or untrusted router 135), do not include a hash of the interface status update combined with a shared secret, and/or appear to be replaying events (e.g., repeatedly submitting a same interface status update).

Policy database 545 may store information associated with particular policies. Example fields that may be stored in policy database 545 are described below with reference to FIG. 6B.

Although FIG. 5 shows example functional components of router policy server 115, in other implementations, router policy server 115 may include fewer functional components, different functional components, differently arranged functional components, or additional functional components than depicted in FIG. 5. Additionally or alternatively, one or more functional components of router policy server 115 may perform one or more tasks described as being performed by one or more other functional components of router policy server 115.

Figure 6A:
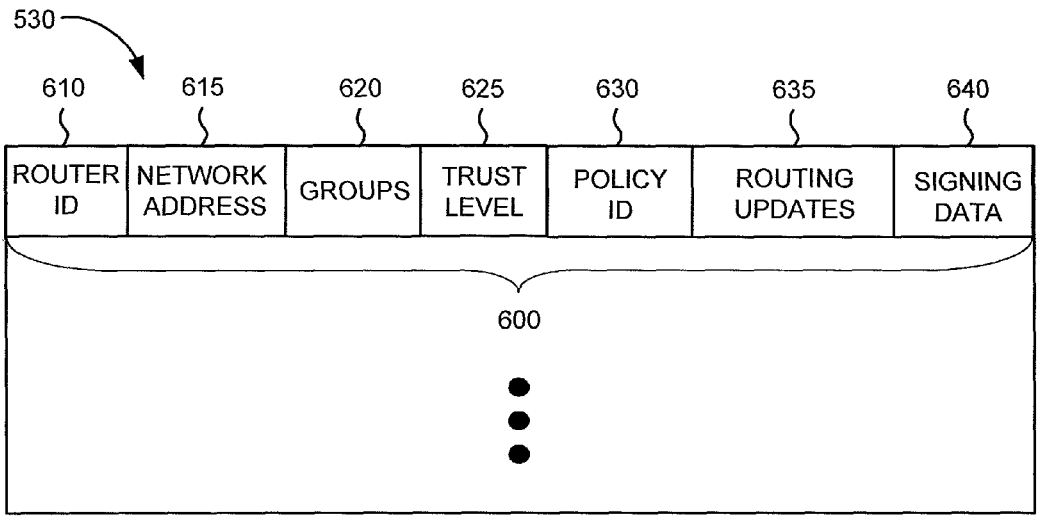
FIG. 6A is a diagram of example fields that may be stored in a router database according to an implementation described herein.

FIG. 6A is a diagram of example fields that may be stored in router database 525 according to an implementation described herein. In one implementation, router database 525 may be implemented in a storage device included as part of memory 330. In another implementation, router database 525 may be stored in a memory associated with another device or a group of devices, separate from or including memory 330. As shown in FIG. 6A, router database 525 may include one or more router records 600 (referred to herein collectively as "router records 600" and individually as "router record 600"). Router record 600 may include a router identification (ID) field 610, a network address field 615, a groups field 620, a trust level field 625, a policy ID field 630, a routing updates field 635, and a signing data field 640.

Router ID field 610 may store an identifier string that uniquely identifies a particular router associated with router record 600. Network address field 615 may store a network address associated with the particular router, such as, for example, an Internet Protocol (IP) address associated with the particular router. Groups field 620 may store information identifying network node groups associated with the particular router, such as, for example, other trusted routers 125 or groups of trusted routers 125.

Trust level field 625 may store a value that represents a trust value associated with the particular router. The trust value may be based, for example, on a particular policy associated with the router and may be a quantitative representation of the particular policy. The trust value may be used by policy engine 520 to generate fast decisions regarding routing information being sent or received by the particular router and/or may be used by policy engine 520 to perform quantitative analysis with respect to the particular policy associated with the particular router.

Policy ID field 630 may identify a particular policy associated with the particular router. Specifications associated with the particular policy may be stored in policy database 545.

Routing updates field 635 may store information about routing updates associated with the particular router. For example, routing updates field 635 may store a particular interval at which the particular router is to receive routing updates from router policy server 115 and/or may store information about particular routing updates received by the particular router during a last routing updates procedure.

Signing data field 640 may store a particular key assigned to the particular router; a signing key associated with the a domain or AS of which the particular router is a member; a particular shared secret associated with a particular router; and/or a digital signature of one or more other fields of router record 600 as signed with a private encryption key of a sending device, a hash of one or more other fields of router record 600 along with a shared secret value known only to the two devices communicating; and/or any other form of an integrity verification mechanism. The particular key (and/or secret) may be used by the particular router to authenticate messages sent and/or received by the particular router from another trusted router 125 and/or from router policy server 115. Additionally or alternatively, pre-computed hashes or signatures may be stored in signing data field 640 to reduce processing costs and latency when processing and distributing policies for a large network.

Although FIG. 6A shows example fields that may be stored in router database 525, in other implementations, router database 525 may include fewer fields, different fields, differently arranged fields, and/or additional fields than depicted in FIG. 6A. For example, while not shown in FIG. 6A, router database 525 may include a database of routers associated with hostile network 130. Such a database of routers associated with hostile network 130 may be used to explicitly identify untrusted router 135 and determine that untrusted router 135 should not be trusted, rather than assuming untrusted router 135 is not to be trusted when untrusted router 135 cannot be identified in router database 525.

Figure 6B:
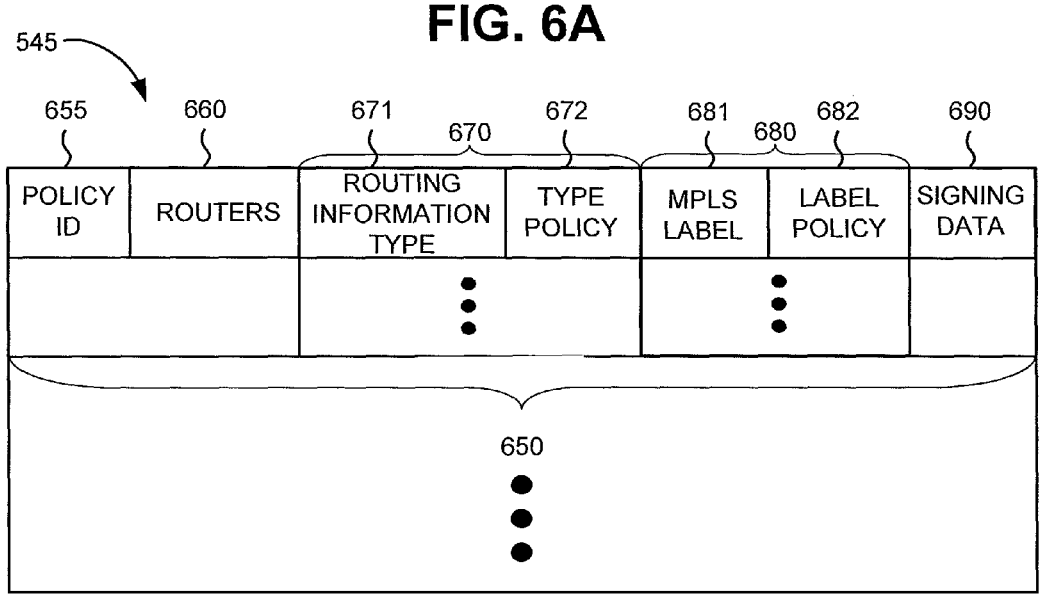
FIG. 6B is a diagram of example fields that may be stored in a policy database according to an implementation described herein.

FIG. 6B is a diagram of example fields that may be stored in policy database 545 according to an implementation described herein. In one implementation, policy database 545 may be implemented in a storage device included as part of memory 330. In another implementation, policy database 545 may be stored in a memory associated with another device or a group of devices, separate from or including memory 330. As shown in FIG. 6B, policy database 545 may include one or more policy records 650 (referred to herein collectively as "policy records 650" and individually as "policy record 650"). Policy record 650 may include a policy ID field 655, a routers field 660, one or more routing type policy fields 670, one or more MPLS label policy fields 680, and a signing data field 690.

Policy ID field 655 may store an identifier string that uniquely identifies a particular policy. Routers field 660 may include information identifying particular routers associated with the particular policy, such as, for example, the identifiers stored in router ID fields 610, of router database 525, that are associated with the policy, as determined based on policy ID field 630.

Routing type policy field 670 may include a routing information type field 671 and an associated type policy field 672. Routing information type field 671 may store information identifying a particular type of routing information, such as, for example, information advertising a new route, information advertising a link loss event, summary route information for a particular sub-network, or traffic engineering information associated with a route (e.g., bandwidth and/or quality of service information associated with a route). Type policy field 672 may store a particular policy associated with the particular routing information type, such as, for example, whether to accept or reject information associated with the particular routing information type; whether to accept or reject information associated with the particular routing information type based on a trust level of a router that originated a message of the particular routing information type; and/or how to transmit information associated with the particular routing information type (e.g., whether to transmit the information to all neighbor routers, to neighbor routers associated with a particular trust level, and/or to router policy server 115).

MPLS label policy field 680 may include an MPLS label field 681 and an associated label policy field 682. MPLS label field 681 may store information identifying a particular MPLS label. Label policy field 682 may store a particular policy associated with the particular MPLS label, such as, for example, information identifying particular routers which are allowed to receive and/or send packets associated with the particular MPLS label; and/or information identifying particular routers which are not allowed to receive and/or send packets associated with the particular MPLS label.

Signing data field 690 may store a particular key associated with the particular policy; a shared secret associated with a group of routers; a digital signature of one or more other fields of policy record 650 as signed with the private encryption key of the sending device; a hash of one or more other fields of policy record 650 along with a shared secret value known only to the two devices communicating; and/or any other form of an integrity verification mechanism. For example, the particular key, hash, and/or digital signature may be used to authenticate a process to install and/or update a local policy, associated with the particular policy, pushed down to trusted router 125 by router policy server 115. As another example, the particular key may be used to sign a policy or derived routing data prior to sending related messages out to a managed router. As yet another example, the hash or digital signature may be used for authenticating routing information messages sent and/or received by trusted router 125 associated with the particular policy.

Although FIG. 6B shows example fields that may be stored in policy database 545, in other implementations, policy database 545 may include fewer fields, different fields, differently arranged fields, and/or additional fields than depicted in FIG. 6B.

Figure 6C:
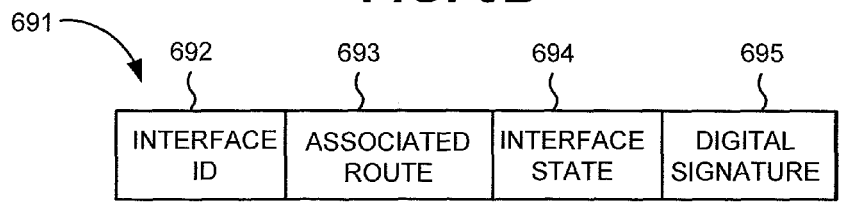
FIG. 6C is a diagram of example fields that may be included in an interface status message according to an implementation described herein.

FIG. 6C shows example field of an interface status message 691 according to an implementation described herein. In one implementation, interface status message 691 may be sent by trusted router 125 to router policy server 115 (or to another trusted router 125) in response to detecting a change in status of a particular interface of trusted router 125. In another implementation, interface status message 691 may be sent by another device and/or in response to a different trigger event. As shown in FIG. 6C, interface status message 691 may include an interface ID field 692, an associated route field 693, an interface state field 694, and a digital signature field 695.

Interface ID field 692 may include information identifying a particular interface associated with trusted router 125. Associated route field 693 may store information identifying a particular route associated with the particular interface. Interface state field 694 may store information about a current status of the particular interface (e.g., whether the interface is up or down). Digital signature field 695 may store a digital signature of one or more of fields 692-694 signed by a private key associated with trusted router 125. Information stored in digital signature field 695 may permit routing information analyzer 540 to verify the integrity of interface status message 691 upon receipt of interface status message 691.

Although FIG. 6C shows example fields that may be included in interface status message 691, in other implementations, interface status message 691 may include fewer fields, different fields, differently arranged fields, and/or additional fields than depicted in FIG. 6C.

FIGS. 7-12 describe processes relating to an implementation where router policy server 115 exercises central control over the flow of routing information and/or the flow of MPLS packets within trusted network 120 and between trusted network 120 and hostile network 130.

Figure 7:
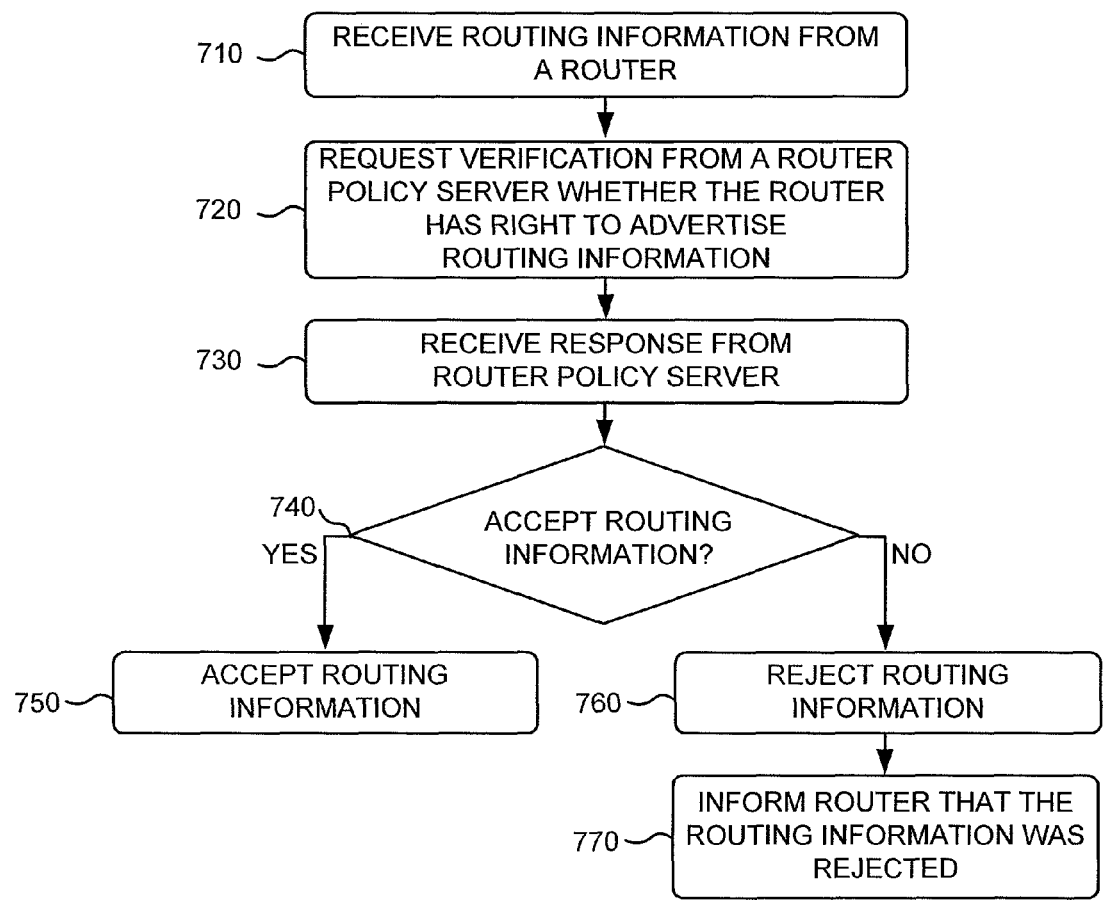
FIG. 7 is a flow diagram illustrating a first process for processing routing information according to an implementation described herein.

FIG. 7 is a flow diagram illustrating a first process for processing an advertised route according to an implementation described herein. In one implementation, the process of FIG. 7 may be performed by trusted router 125. In other implementations, some or all of the process of FIG. 7 may be performed by another device or a group of devices separate from and/or possibly remote from trusted router 125 and/or including trusted router 125.

The process of FIG. 7 may include receiving routing information from a router (block 710). For example, trusted router 125 may receive a message including an advertised route from untrusted router 135. The advertised route may include, for example, a link state advertisement, such as new network link between network nodes in hostile network 130 or loss of an existing network link in hostile network 130. As another example, trusted router 125 may receive a message including an advertised route from another trusted router in trusted network 120, such as a link state advertisement indicating a new network link between network nodes in trusted network 120 or loss of an existing network link in trusted network 120. As yet another example, the routing information may correspond to a packet that includes a particular MPLS label. The received routing message may include information identifying the router that generated the routing message. For example, the received message may include a packet with a header that includes a source IP address field, and the IP address of the router that sent the routing information may be included in the source IP address field.

Verification may be requested from a router policy server whether the router has rights to advertise the routing information (block 720). For example, routing message manager 450 may receive the message and detect that the message includes routing information (e.g., includes an advertised route). Routing message manager 450 of trusted router 125 may, in response to detecting that the message includes the routing information, forward the message to router policy server interface 470 of trusted router 125. Router policy server interface 470 may send a message to router policy server 115, inquiring whether to accept the routing information. The message sent to router policy server 115 may include information identifying the router that sent the routing information (e.g., IP address of the router).

A response may be received from the router policy server (block 730). For example, router policy server interface 470 may receive a message from router policy server 115 with an instruction whether to accept or reject the routing information. A determination may be made whether to accept the routing information (block 740). For example, router policy server interface 470 may determine whether the instruction included in the message received from router policy server 115 instructs trusted router 125 to accept or reject the routing information. For example, if the routing information was received from untrusted router 135, the received instruction may be to reject the routing information, and if the routing information was received from another trusted router 125, the received instructions may be to accept the routing information.

If it is determined that the routing information should be accepted (block 740—YES), the routing information may be accepted (block 750). For example, router policy server interface 470 may instruct routing message manager 450 to forward the routing message to forwarding table manager 460. Forwarding table manager 460 may re-compute a forwarding table for trusted router 125 and store any changes in the forwarding table in forwarding table 425.

If it is determined that the routing information should not be accepted (block 740—NO), the advertised route may be rejected (block 760). For example, router policy server interface 470 may instruct routing message manager 450 to discard the routing message.

In one implementation, the router, which sent the routing information, may be informed that the routing information was rejected (block 770). For example, routing message manager 450 may send a message informing the router (e.g., untrusted router 135) that the routing information was rejected. The message may further instruct the router (e.g., untrusted router 135) to forward the routing information to router policy server 115. In another implementation, the router may not be informed. In other words, trusted router 125 may reject the routing information without informing untrusted router 135 that the routing information was rejected.

Figure 8:
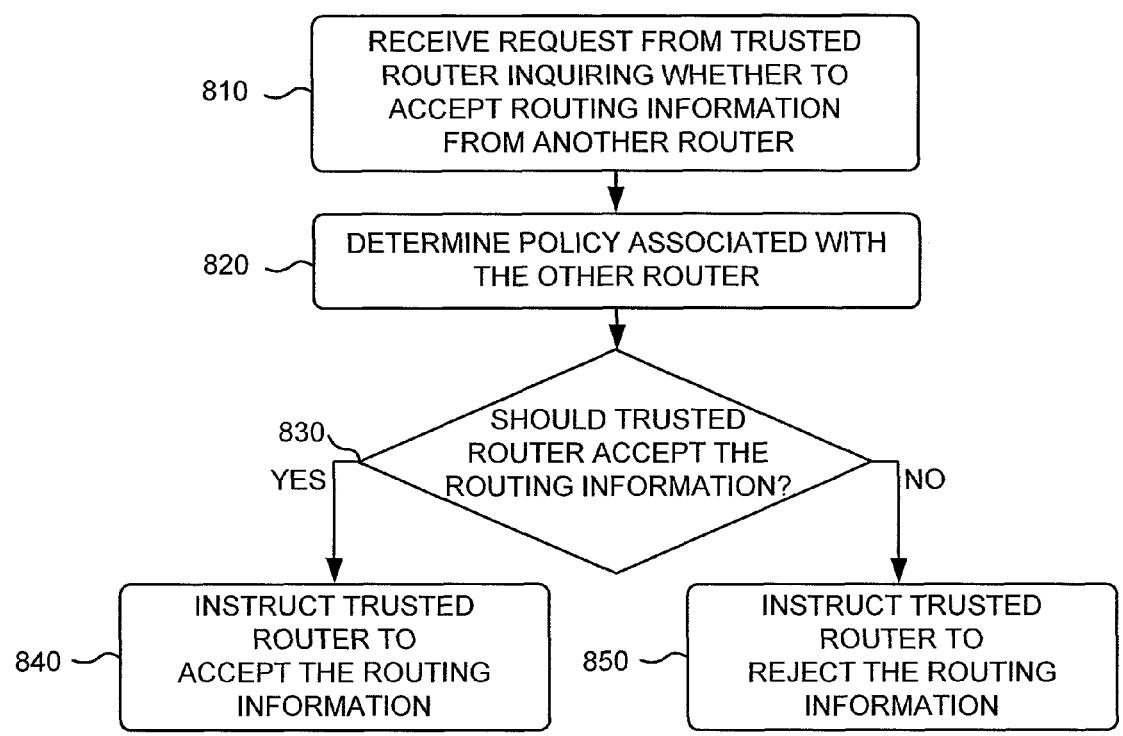
FIG. 8 is a flow diagram illustrating a second process for processing routing information according to an implementation described herein.

FIG. 8 is a flow diagram illustrating a second process for processing an advertised route according to an implementation described herein. In one implementation, the process of FIG. 8 may be performed by router policy server 115. In other implementations, some or all of the process of FIG. 8 may be performed by another device or a group of devices separate from and/or possibly remote from router policy server 115 and/or including router policy server 115.

The process of FIG. 8 may include receiving a request from a trusted router inquiring whether to accept routing information from another router (block 810). For example, router interface 510 may receive a message from trusted router 125, the received message including information identifying the router that sent the routing information, such as the IP address of the router that sent the routing information.

A policy associated with the other router may be determined (block 820). For example, policy engine 520 may access router database 525 to determine whether the router, which sent the routing information, is associated with a corresponding router record 600 in router database 525. Policy engine 520 may identify a policy associated with the router based on policy ID field 630 of the corresponding router record 600. If policy engine 520 cannot identify a router record 600, policy engine 520 may determine that the router corresponds to untrusted router 135 and may select a default policy associated with untrusted router 135.

A determination may be made whether the trusted router should accept the routing information (block 830). For example, policy engine 520 may determine whether the identified policy associated with the other router, which sent the routing information, allows the other router to advertise the routing information. Policy engine 520 may identify a routing information type or a particular MPLS label associated with the routing information and may access routing information type field 671 or MPLS label field 681, stored in policy record 650 corresponding to the identified policy, to identify information stored in a corresponding type policy field 672 or label policy field 682. The information stored in type policy field 672 or label policy field 682 may indicate whether the router is allowed to transmit the routing information type or the particular MPLS label. Additionally or alternatively, policy engine 520 may use a trust level associated with the other router to determine whether the trusted router should accept the routing information. Additionally or alternatively, policy engine 520 may determine whether the trusted router and the other router are associated with a same group (e.g., by checking groups field 620 associated with the trusted router and groups field 620 associated with the other router) to determine whether the trusted router should accept the routing information.

Additionally or alternatively, policy engine 520 may access policy record 650 associated with trusted router 125, which received the routing information, to determine whether the policy associated with trusted router 125 allows trusted router 125 to accept the routing information.

If it is determined that the trusted router should accept the routing information (block 830—YES), the trusted router may be instructed to accept the routing information (block 840). For example, router interface 510 may send a message to trusted router 125, instructing trusted router 125 to accept the routing information. If it is determined that the trusted router should not accept the routing information (block 830—NO), the trusted router may be instructed to reject the advertised route (block 850). For example, router interface 510 may send a message to trusted router 125, instructing trusted router 125 to reject the routing information.

Figure 9:
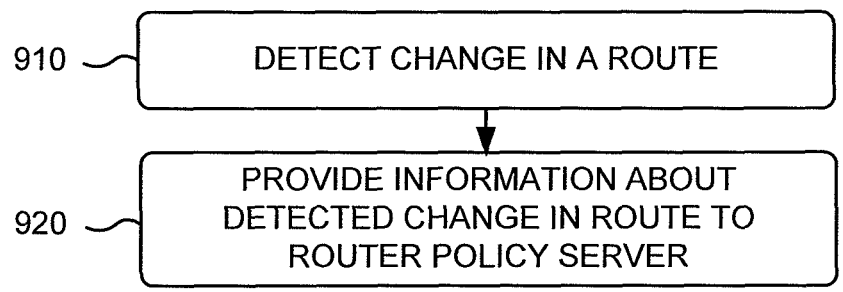
FIG. 9 is a flow diagram illustrating a process for processing a detected change in a route according to an implementation described herein.

FIG. 9 is a flow diagram illustrating a process for processing a detected change in a route according to an implementation described herein. In one implementation, the process of FIG. 9 may be performed by trusted router 125. In other implementations, some or all of the process of FIG. 9 may be performed by another device or a group of devices separate from and/or possibly remote from trusted router 125 and/or including trusted router 125.

The process of FIG. 9 may include detecting a change in a route (block 910). For example, routing engine 430 may detect that an interface, associated with trusted router 125 or associated with a neighbor of trusted router 125, is down. As another example, routing engine 430 may detect a new link. As yet another example, routing engine 430 may detect a change in traffic engineering conditions associated with a link (e.g., a change in available bandwidth). As yet another example, trusted router 125 may correspond to an area border router and may generate summary routing information corresponding to a network area.

Information about the detected change in the route may be provided to a router policy server (block 910). For example, router policy server interface 470 may generate a message that includes information about the detected change and may send the generated message to router policy server 115.

Figure 10:
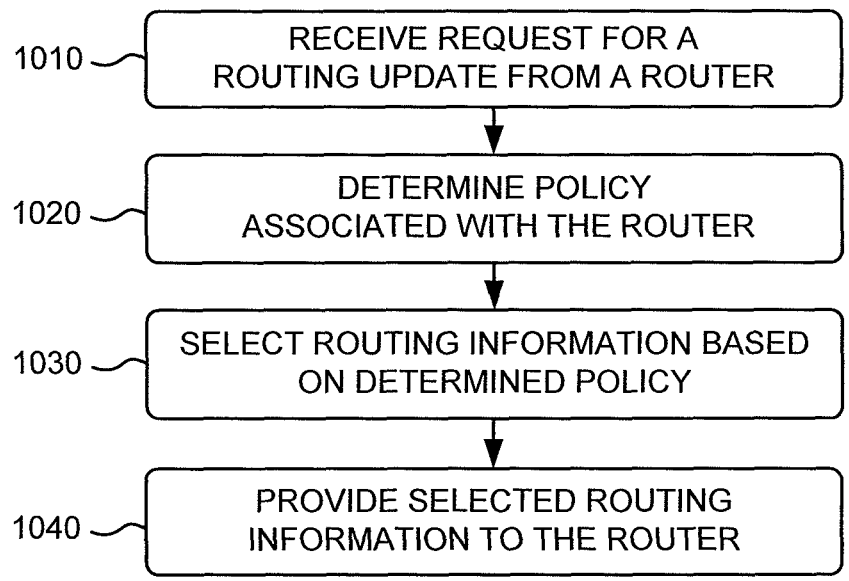
FIG. 10 is a flow diagram illustrating a process for processing a request for a routing update according to an implementation described herein.

FIG. 10 is a flow diagram illustrating a process for processing a routing update request according to an implementation described herein. In one implementation, the process of FIG. 9 may be performed by router policy server 115. In other implementations, some or all of the process of FIG. 10 may be performed by another device or a group of devices separate from and/or possibly remote from router policy server 115 and/or including router policy server 115.

The process of FIG. 10 may include receiving a request for a routing update from a router (block 1010). For example, trusted router 125, or untrusted router 135, may request a routing update from router policy server 115. A policy associated with the router may be determined (block 1020). Policy engine 520 may determine an identity associated with the router, by, for example, retrieving an IP address associated with the router from the received message, or by retrieving a router ID included in the message. Policy engine 520 may identify a router record 600 based on the identity of the router and may determine a policy ID stored in policy ID field 630 of router record 600. If a router record 600 cannot be located (e.g., the message was received from untrusted router 135), policy engine 520 may assume the router is an untrusted router and may select a default policy.

Routing information may be selected based on the determined policy (block 1030). For example, based on the determined policy, policy engine 520 may determine what kind of routing information the router is allowed to receive. For example, trusted router 125 may be allowed to receive a whole topology map of trusted network 120, while untrusted router 135 may only receive information about links between hostile network 130 and trusted network 120. The routing information may further be selected based on routing changes that occurred since the last time the router received routing updates. Policy engine 520 may determine what updates the router needs to receive based on, for example, accessing routing updates field 635 of routing record 600 associated with the router. Alternatively or additionally, policy engine 520 may use a trust level associated with the router to determine what updates the router is allowed to receive.

The selected routing information may be provided to the router (block 1040). For example, router interface 510 may transmit the selected routing information to the router that requested the routing update.

Figure 11:
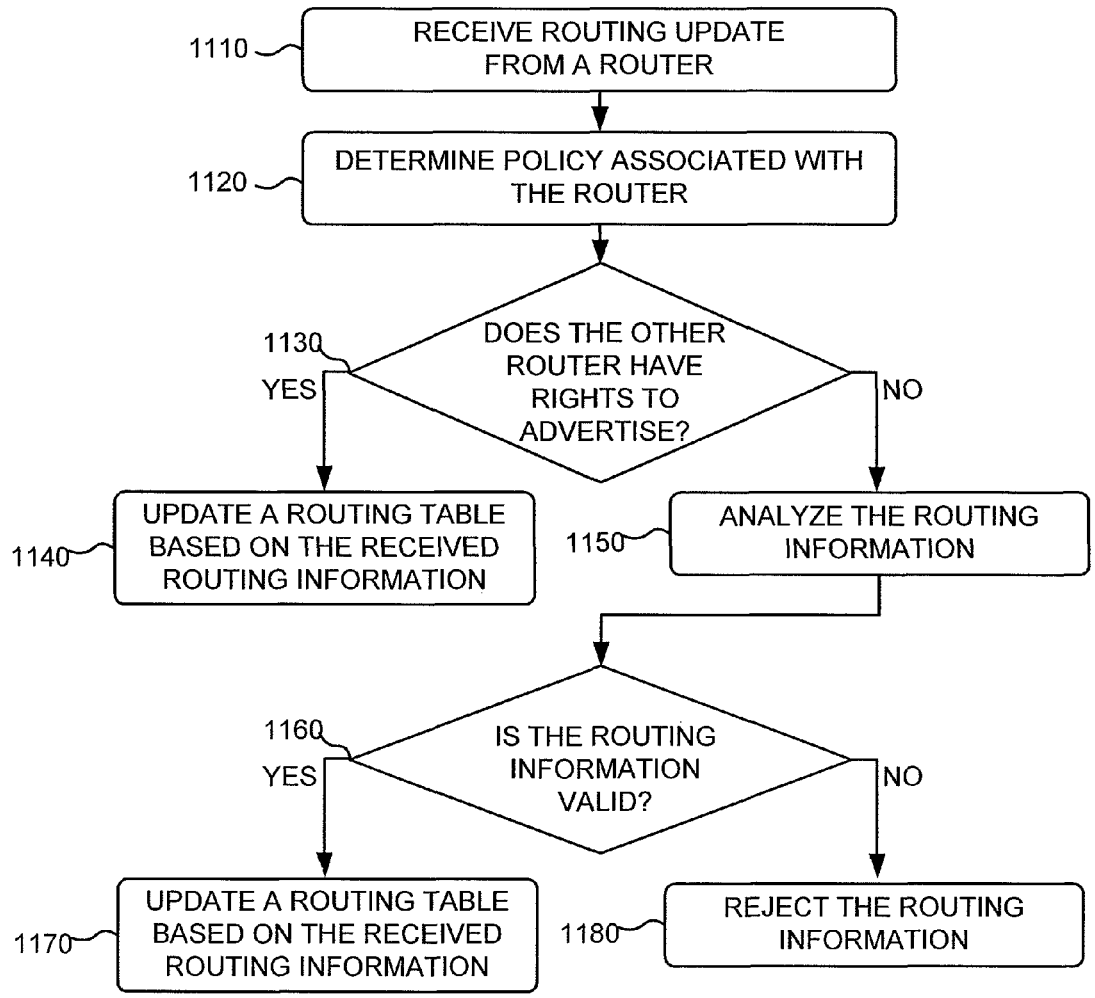
FIG. 11 is a flow diagram illustrating a process for processing a routing update according to an implementation described herein.

FIG. 11 is a flow diagram illustrating a process for processing a routing update according to an implementation described herein. In one implementation, the process of FIG. 11 may be performed by router policy server 115. In other implementations, some or all of the process of FIG. 11 may be performed by another device or a group of devices separate from and/or possibly remote from router policy server 115 and/or including router policy server 115.

The process of FIG. 11 may include receiving a routing update from a router (block 1110). For example, trusted router 125 may detect that an interface, associated with trusted router 125 or associated with a neighbor of trusted router 125, is down; may detect a new link; may detect a change in traffic engineering conditions associated with a link; or may generate summary routing information corresponding to a network area. Router 125 may provide information about the detected change to router policy server 115.

A policy associated with the router may be determined (block 1120). Policy engine 520 may determine an identity associated with the router, by, for example, retrieving an IP address associated with the router from the received routing update message, or by retrieving a router ID included in the routing update message. Policy engine 520 may identify a router record 600 based on the identity of the router and may determine a policy ID stored in policy ID field 630 of router record 600. If a router record 600 cannot be located (e.g., the message was received from untrusted router 135), policy engine 520 may assume the router is an untrusted router and may select a default policy.

A determination may be made whether the router has rights to advertise the routing update (block 1130). For example, policy engine 520 may determine a type of routing information included in the routing update message and may determine whether policy record 650 associated with router indicates that the router is allowed to advertise that type of routing information. Alternatively or additionally, policy engine 520 may use a trust level associated with the router to determine whether the router has rights to advertise the routing update. If it is determined that the router does have rights to advertise (block 1130—YES), a routing table may be updated based on the received information (block 1040). For example, policy engine 520 may indicate to routing table manager 530 to update routing table 535 based on the received routing update.

If it is determined that the router does not have rights to advertise (block 1130—NO), in one implementation, the routing information may be automatically rejected (not shown in FIG. 11). In another implementation, if it is determined that the router does not have rights to advertise (block 1130—NO), router policy server 115 may include functionality to determine whether the routing information is valid, and the routing information may be analyzed (block 1150). For example, policy engine 520 may provide the routing information included in the routing update to routing information analyzer 540. In one implementation, routing information analyzer 540 may compare the routing information, included in the routing update, with routing table 535 to determine whether the routing information is consistent with routing table 535. In another implementation, routing information analyzer 540 may analyze the routing information, included in the routing update, using another technique.

A determination may be made whether the routing information is valid (block 1160). For example, based on the analysis, routing information analyzer 540 may determine whether the routing information is valid. If it is determined that the routing information is valid (block 1160—YES), the routing table may be updated based on the received routing information (block 1170). For example, routing information analyzer 540 may indicate to routing table manager 530 to update routing table 535 based on the received routing update.

If it is determined that the routing information is not valid (block 1160—NO), the routing information may be rejected (block 1180). For example, routing information analyzer 540 may indicate to routing table manager 530 to discard the routing update.

Figure 12:
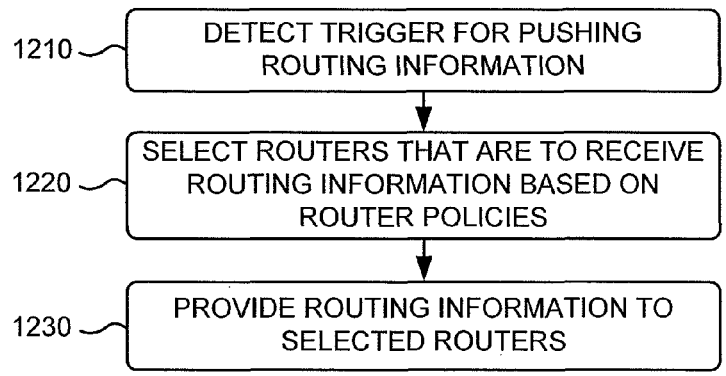
FIG. 12 is a flow diagram illustrating a process for pushing routing information according to an implementation described herein.

FIG. 12 is a flow diagram illustrating a process for pushing routing information according to an implementation described herein. In one implementation, the process of FIG. 12 may be performed by router policy server 115. In other implementations, some or all of the process of FIG. 12 may be performed by another device or a group of devices separate from and/or possibly remote from router policy server 115 and/or including router policy server 115.

The process of claim 12 may include detecting a trigger for pushing routing information (block 1210). For example, policy engine 520 may detect a particular trigger for pushing routing information down to routers stored in router database 525. In one example, the trigger may include receiving a particular routing update (e.g., a routing update involving a change in network topology). In another example, the trigger may include detecting that a particular interval has elapsed. For example, router policy server 115 may collect routing updates received from particular trusted routers 125 in trusted network 120 and may distribute the received routing updates, or a routing table updated based on the received updates, to other trusted routers 125 at particular intervals. As yet another example, the trigger may include receiving a request for routing updates from a particular router.

Routers that are to receive routing information may be selected (block 1220). In one implementation, routing engine 520 may provide routing information to all trusted routers 125 in trusted network 120. In another implementation, a first set of trusted routers 125 may receive a first type of routing information and a second set of trusted routers 125 may receive a second type of routing information. For example, routers in a particular sub-network of trusted network 120 may not receive routing updates pertaining to another sub-network of trusted network 120. In one implementation, untrusted routers 135 may not receive any routing information. In another implementation, untrusted routers 135 may receive information about links between hostile network 130 and trusted network 120, without receiving information about links that do not directly relate to connections to hostile network 130.

The routing information may be provided to the selected routers (block 1230). For example, router interface 510 may provide the determined routing information to the selected routers.

Figure 13:
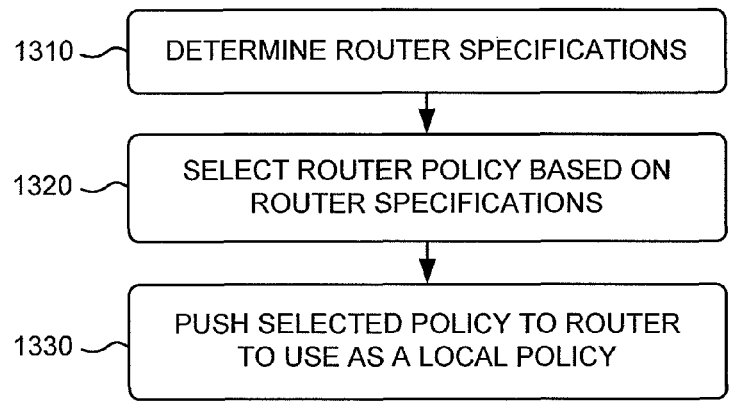
FIG. 13 is a flow diagram illustrating a process for pushing a local policy according to an implementation described herein.
Figure 14:
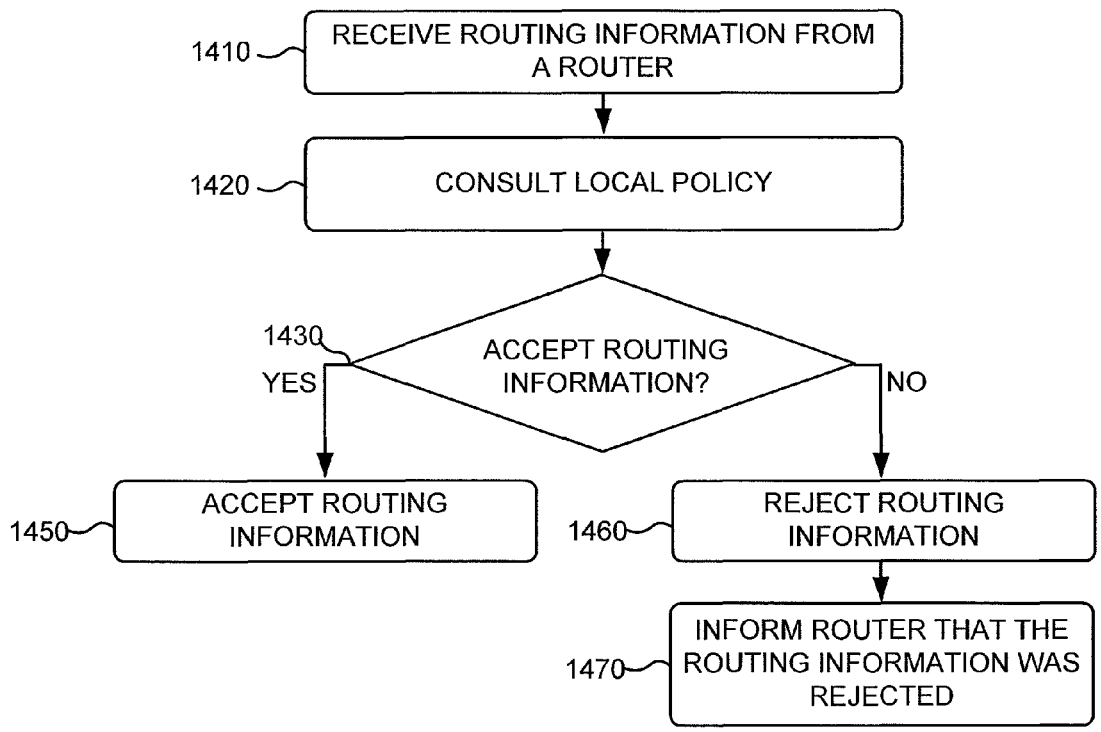
FIG. 14 is a flow diagram illustrating a second process for processing routing information based on a local policy according to an implementation described herein.
Figure 15:
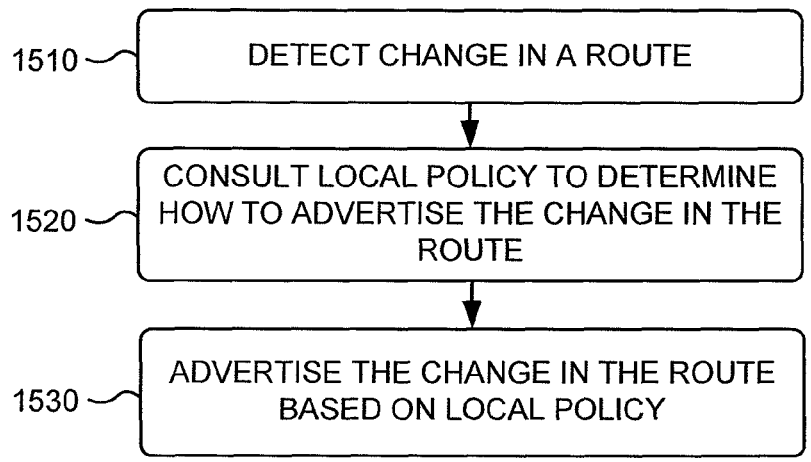
FIG. 15 is a flow diagram illustrating a process for processing a detected change in a route based on a local policy according to an implementation described herein.

FIGS. 13-15 describe processes relating to an implementation where router policy server 115 pushes a local policy to trusted router 125, allowing trusted router 125 to make decisions regarding the flow of routing information, and/or the flow of MPLS packets, through trusted router 125.

FIG. 13 is a flow diagram illustrating a process for pushing a local policy according to an implementation described herein. In one implementation, the process of FIG. 13 may be performed by router policy server 115. In other implementations, some or all of the process of FIG. 13 may be performed by another device or a group of devices separate from and/or possibly remote from router policy server 115 and/or including router policy server 115.

Router specifications may be determined (block 1310). For example, policy engine 520 may determine, for a particular trusted router 125, router specifications. The router specifications may include, for example, a determination that the particular trusted router 125 includes a link to hostile network 130; a determination that the particular trusted router 125 does not include a link to hostile network 130; a determination whether the particular trusted router 125 corresponds to an area border router; particular MPLS labels associated with the particular trusted router 125; particular traffic engineering conditions associated with the particular trusted router 125; and/or other types of information.

A router policy may be selected based on the determined router specifications (block 1320). For example, policy engine 520 may identify a particular policy in policy database 545 that corresponds to the determined router specifications. As another example, policy engine 520 may generate a new policy based on the router specifications and create a new policy record 650 in policy database 545 based on the new policy.

The selected router policy may be pushed to a router to use as a local routing policy (block 1330). For example, router interface 510 may push the selected router policy to the particular trusted router 125. The particular trusted router 125 may store the received policy in local policy engine 480.

FIG. 14 is a flow diagram illustrating a second process for processing routing information based on a local policy according to an implementation described herein. In one implementation, the process of FIG. 14 may be performed by trusted router 125. In other implementations, some or all of the process of FIG. 14 may be performed by another device or a group of devices separate from and/or possibly remote from trusted router 125 and/or including trusted router 125.

The process of FIG. 14 may include receiving routing information from a router (block 1410). For example, trusted router 125 may receive a message including an advertised route from untrusted router 135. The advertised route may include, for example, a new network link between network nodes in hostile network 130, or loss of an existing network link in hostile network 130. As another example, trusted router 125 may receive a message including an advertised route from another trusted router in trusted network 120, indicating a new network link between network nodes in trusted network 120, or loss of an existing network link in trusted network 120. As yet another example, the routing information may correspond to a packet that includes a particular MPLS label. The received routing message may include information identifying the router that generated the routing message. For example, the received message may include a packet with a header that includes a source IP address field, and the IP address of the router that sent the routing information may be included in the source IP address field.

A local policy may be consulted (block 1420). For example, routing message manager 450 may receive the message and detect that the message includes routing information (e.g., includes an advertised route). Routing message manager 450 of trusted router 125 may, in response to detecting that the message includes the routing information, forward the message to local policy engine 480 of trusted router 125. Local policy engine 480 may analyze the received routing engine with respect to a local policy received from router policy server 115.

A determination may be made whether to accept the routing information (block 1430). For example, local policy engine 480 may determine whether to accept or reject the routing information. For example, if the routing information was received from untrusted router 135, local policy engine 480 may determine to reject the routing information, and if the routing information was received from another trusted router 125, local policy engine 480 may determine to accept the routing information.

If it is determined that the routing information should be accepted (block 1430—YES), the routing information may be accepted (block 1450). For example, local policy engine 480 may instruct routing message manager 450 to forward the routing message to forwarding table manager 460. Forwarding table manager 460 may re-compute a forwarding table for trusted router 125 and store any changes in the forwarding table in forwarding table 425.

If it is determined that the routing information should not be accepted (block 1430—NO), the routing information may be rejected (block 1460). For example, local policy engine 480 may instruct routing message manager 450 to discard the routing message.

In one implementation, the router, which sent the routing information, may be informed that the routing information was rejected (block 1470). For example, routing message manager 450 may send a message informing the router (e.g., untrusted router 135) that the routing information was rejected. The message may further instruct the router (e.g., untrusted router 135) to forward the routing information to router policy server 115. In another implementation, the router may not be informed. In other words, trusted router 125 may reject the routing information without informing untrusted router 135 that the routing information was rejected.

FIG. 15 is a flow diagram illustrating a process for processing a detected change in a route based on a local policy according to an implementation described herein. In one implementation, the process of FIG. 15 may be performed by trusted router 125. In other implementations, some or all of the process of FIG. 15 may be performed by another device or a group of devices separate from and/or possibly remote from trusted router 125 and/or including trusted router 125.

The process of FIG. 15 may include detecting a change in a route (block 1510). For example, routing engine 430 may detect that an interface, associated with trusted router 125 or associated with a neighbor of trusted router 125, is down. As another example, routing engine 430 may detect a new link. As yet another example, routing engine 430 may detect a change in traffic engineering conditions associated with a link (e.g., a change in available bandwidth). As yet another example, trusted router 125 may correspond to an area border router and may generate summary routing information corresponding to a network area.

A local policy may be consulted to determine how to advertise the detected change in the route (block 1520). For example, local policy engine 480 may determine a type of change that was detected and may determine how to advertise the detected change. For example, if the change was detected by a particular trusted router 125 that does not have any direct links to hostile network 130, local policy engine 480 may determine to broadcast information about the detected change to trusted routers 125 that are neighbors of the particular trusted router 125. On the other hand, if the change was detected by a particular trusted router 125 that includes a direct link to hostile network 130, local policy engine 480 may determine to transmit information about the detected change to other trusted routers 125 connected to the particular trusted router 125, without transmitting the information along any links to hostile network 130. As another example, local policy engine 480 may determine that the detected change should be provided only to router policy server 115, without being transmitted to any other routers.

Information about the detected change in the route may be advertised based on the local policy (block 1530). For example, routing message manager 450 and/or router policy server interface 470 may generate a message that includes information about the detected change and may send the generated message to routers and/or router policy server 115 as determined by local policy engine 480.

Figure 16:
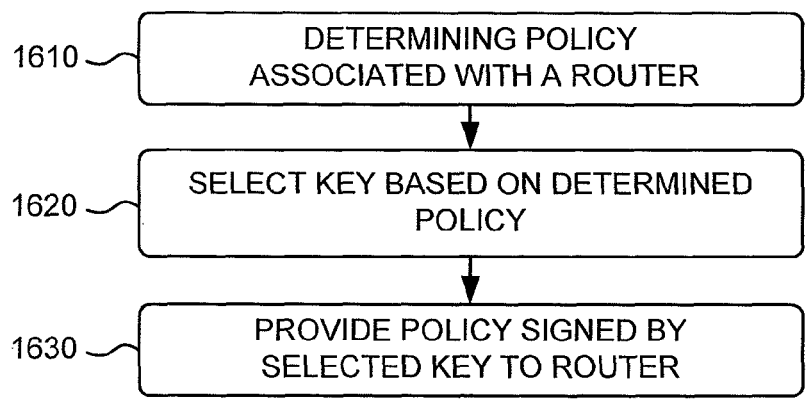
FIG. 16 is a flow diagram illustrating a process for providing a key according to an implementation described herein.
Figure 17:
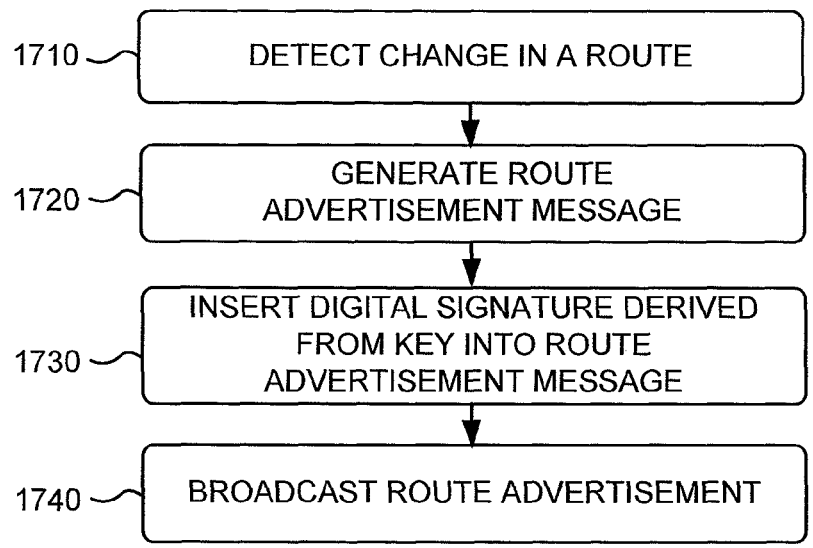
FIG. 17 is a flow diagram illustrating a process for providing routing information using a key according to an implementation described herein.
Figure 18:
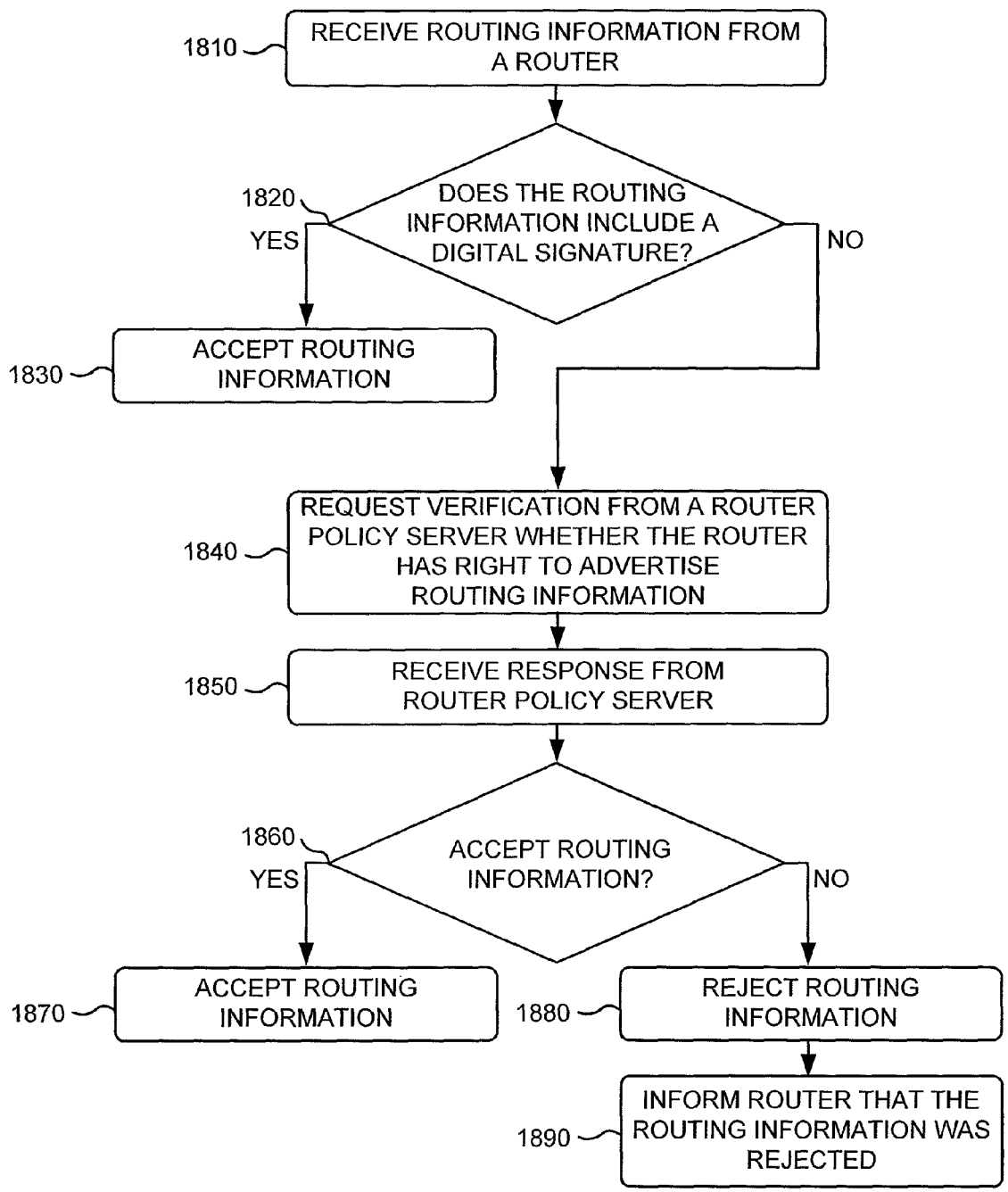
FIG. 18 is a flow diagram illustrating a process for processing routing information using a key according to an implementation described herein.

FIGS. 16-18 describe processes relating to an implementation where router policy server 115 provides a key to trusted routers 125 and where trusted routers 125 exchange routing information using the provided key. In one implementation, the provided key used may be based on a symmetric key algorithm (e.g., based on a shared secret key between a sender and a receiver). In another implementation, the provided key may be based on a public key and private key algorithm (e.g., the receiver need not possess a secret key, yet may verify a message, generated with a private key, using a public key).

FIG. 16 is a flow diagram illustrating a process for providing a key according to an implementation described herein. While FIG. 16 illustrates a process where a key is provided to trusted router 125 by router policy server 115, in another implementation, the key made be provided to trusted router 125 using another technique. For example, a key made be generated during manufacture of trusted router 125 and encoded in the hardware of trusted router 125. As another example, a key made be entered into trusted router 125 during setup and/or configuration of trusted router 125. As yet another example, a key may be stored on a removable computer-readable medium, which may be installed into trusted router 125 during configuration or during operation of trusted router 125. In one implementation, the process of FIG. 16 may be performed by router policy server 115. In other implementations, some or all of the process of FIG. 16 may be performed by another device or a group of devices separate from and/or possibly remote from router policy server 115 and/or including router policy server 115.

In one implementation, the process or FIG. 16 may include determining a policy associated with a router (block 1610) and a key may be selected based on the determined policy (block 1620). For example, policy engine 520 may determine a policy ID associated with the router by accessing router record 600, and may access policy record 650, associated with the determined policy ID, to access a key stored in signing data field 690 of policy record 650. In another implementation (not shown in FIG. 16), a key, a shared secret, and/or another authenticator may be selected using another technique. For example, an authenticator may be selected based on a router model associated with the router, based on an MPLS label associated with the router, based on a group or subnet associated with the router, or based on another specification associated with the router.

A policy digitally signed by the selected key (and/or shared secret) may be provided to the router (block 1630). For example, router interface 510 may sign a request with the selected key and send the signed request to router policy server interface 470, using a secure communication method (e.g., using an encrypted communication). As another example, router interface 510 may send a pre-computed hash and/or digital signature along with the policy being sent to router policy server interface 470.

FIG. 17 is a flow diagram illustrating a process for providing routing information using a key according to an implementation described herein. In one implementation, the process of FIG. 17 may be performed by trusted router 125. In other implementations, some or all of the process of FIG. 17 may be performed by another device or a group of devices separate from and/or possibly remote from trusted router 125 and/or including trusted router 125.

The process of FIG. 17 may include detecting a change in a route (block 1710). For example, routing engine 430 may detect that an interface, associated with trusted router 125 or associated with a neighbor of trusted router 125, is down. As another example, routing engine 430 may detect a new link. As yet another example, routing engine 430 may detect a change in traffic engineering conditions associated with a link (e.g., a change in available bandwidth). As yet another example, trusted router 125 may correspond to an area border router and may generate summary routing information corresponding to a network area.

A route advertisement message may be generated (block 1720). For example, routing message manager 450 may generate a route advertisement message that includes information about the detected change in the route. A digital signature, derived from a key, and/or another type of authenticator may be inserted into the generated route advertisement message (block 1730). For example, routing message manager 450 may use the key to generate a digital signature based on one or more critical fields of a route advertisement and insert the generated digital signature into the route advertisement message.

The route advertisement may be broadcast (block 1740). For example, routing message manager 450 may broadcast the route advertisement message to its neighbors (e.g., other trusted routers 125). The neighbors may verify that the route advertisement message based on the included digital signature and/or another type of authenticator, and may re-broadcast the message.

FIG. 18 is a flow diagram illustrating a process for processing routing information using a key according to an implementation described herein. In one implementation, the process of FIG. 18 may be performed by trusted router 125. In other implementations, some or all of the process of FIG. 18 may be performed by another device or a group of devices separate from and/or possibly remote from trusted router 125 and/or including trusted router 125.

The process of FIG. 18 may include receiving routing information from a router (block 1810). For example, trusted router 125 may receive a message including an advertised route from untrusted router 135. The advertised route may include, for example, a new network link between network nodes in hostile network 130, or loss of an existing network link in hostile network 130. As another example, trusted router 125 may receive a message including an advertised route from another trusted router in trusted network 120, indicating a new network link between network nodes in trusted network 120, or loss of an existing network link in trusted network 120. As yet another example, the routing information may correspond to a packet that includes a particular MPLS label. The received routing message may include information identifying the router that generated the routing message. For example, the received message may include a packet with a header that includes a source IP address field, and the IP address of the router that sent the routing information may be included in the source IP address field.

A determination may be made whether the routing information includes a digital signature (block 1820). For example, routing message manager 450 may check if the received message includes a digital signature, and whether the included digital signature was generated by a key stored in trusted router 125. If the included digital signature is validated by the public key of trusted router 125, the digital signature may be determined to be valid. If it is determined that the routing information includes a valid digital signature, the routing information may be accepted (block 1830). For example, routing message manager 450 may forward the routing information to forwarding table manager 460 and forwarding table manager 460 may update forwarding table 425 based on the received routing information. In another implementation, routing message manager 450 may generate a hash from various fields of a routing information message and a shared secret unique to itself and trusted router 125. If the generated hash corresponds to a hash received with the routing information message from trusted router 125, the routing information message may be determined to be valid. Based on this valid state, other actions may occur as stated above.

In one implementation, if it is determined that the routing information does not include a valid key (block 1820—NO), the routing information may be automatically rejected by routing message manager 450 (not shown in FIG. 18). In another implementation, if it is determined that the routing information does not include a valid key (block 1820—NO), verification may be requested from a router policy server whether the router has rights to advertise the routing information (block 1840). For example, routing message manager 450 may, in response to detecting that the received routing information message does not include a valid digital signature or another type of authenticator, forward the routing information message to router policy server interface 470. Router policy server interface 470 may send a message to router policy server 115, inquiring whether to accept the routing information. The message sent to router policy server 115 may include information identifying the router that sent the routing information (e.g., IP address of the router).

A response may be received from the router policy server (block 1850). For example, router policy server interface 470 may receive a message from router policy server 115 with an instruction whether to accept or reject the routing information. A determination may be made whether to accept the routing information (block 1860). For example, router policy server interface 470 may determine whether the instruction included in the message received from router policy server 115 instructs trusted router 125 to accept or reject the routing information. For example, if the routing information was received from untrusted router 135, the received instruction may be to reject the routing information, and if the routing information was received from another trusted router 125, the received instructions may be to accept the routing information.

If it is determined that the routing information should be accepted (block 1860—YES), the routing information may be accepted (block 1870). For example, router policy server interface 470 may instruct routing message manager 450 to forward the routing message to forwarding table manager 460. Forwarding table manager 460 may re-compute a forwarding table for trusted router 125 and store any changes in the forwarding table in forwarding table 425.

If it is determined that the routing information should not be accepted (block 1860—NO), the advertised route may be rejected (block 1880). For example, router policy server interface 470 may instruct routing message manager 450 to discard the routing message.

In one implementation, the router, which sent the routing information, may be informed that the routing information was rejected (block 1890). For example, routing message manager 450 may send a message informing the router (e.g., untrusted router 135) that the routing information was rejected. The message may further instruct the router (e.g., untrusted router 135) to forward the routing information to router policy server 115. In another implementation, the router may not be informed. In other words, trusted router 125 may reject the routing information without informing untrusted router 135 that the routing information was rejected.

The foregoing description of implementations, described above, provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-18, the order of the blocks may be modified in other implementations. Further, non-dependent blocks may be performed in parallel.

Also, certain portions of the implementations may have been described as a "component," "engine," "manager," "interface," or "analyzer" that performs one or more functions. The terms "component," "engine," "manager," "interface," and "analyzer" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   managing, by a computing device, a routing table for a trusted network;
   receiving, by the computing device, a request for a first routing update from a first router device;
   determining, by the computing device, that the first router device corresponds to a trusted router device;
   determining, by the computing device, a policy associated with the first router device;
   selecting, by the computing device, routing information based on the determined policy;
   providing, by the computing device, the selected routing information to the first router device;
   receiving, by the computing device, a request for a second routing update from a second router device;
   determining, by the computing device, that the second router device corresponds to an untrusted router; and
   providing, by the computing device, partial information from the routing table to the second router device, based on determining that the router device corresponds to an untrusted router, wherein the partial information corresponds to less information than the selected routing information provided to the trusted router.

2. The method of claim 1, wherein the second router device is located in a hostile network and wherein the partial information includes only information relating to links between the trusted network and the hostile network.

3. The method of claim 1, wherein the first router device is located in a first country and wherein the second router device is located in a second country, and wherein the first country and the second country have a hostile relationship with respect to network security.

4. The method of claim 1, wherein the selected routing information includes a whole topology of the trusted network.

5. The method of claim 4, wherein determining that the second router device corresponds to an untrusted router includes:
   determining that a router record does not exist for the second router in a router database managed by the computing device.

6. The method of claim 1, wherein the selected routing information is further selected based on routing changes that occurred since a last time the first router device received routing updates.

7. The method of claim 1, wherein the policy associated with the first router device includes a particular policy associated with a particular routing information type.

8. The method of claim 7, wherein the particular policy includes at least one of:
   an indication whether to accept or reject information associated with the particular routing information type;
   an indication whether to accept or reject information associated with the particular routing information type based on a trust level of a router device that originated a message of the particular routing information type; or
   an indication how to transmit information associated with the particular routing information type.

9. The method of claim 1, wherein the policy associated with the first router device includes a particular policy associated with a particular multi-protocol label switching (MPL) label.

10. The method of claim 9, wherein the particular policy associated with the particular MPLS label includes at least one of:
    information identifying particular routers that are allowed to receive or send packets associated with the particular MPLS label; or
    information identifying particular routers that are not allowed to receive or send packets associated with the particular MPLS label.

11. A computing device comprising:
    a memory storing instructions executable by a processor; and
    a processor configured to execute the instructions to:
       manage a routing table for a trusted network;
       receive a request for a first routing update from a first router device;

determine that the first router device corresponds to a trusted router device;

determine a policy associated with the first router device;

select routing information based on the determined policy;

provide the selected routing information to the first router device;

receive a request for a second routing update from a second router device;

determine that the second router device corresponds to an untrusted router; and provide partial information from the routing table to the second router device, based on determining that the router device corresponds to an untrusted router, wherein the partial information corresponds to less information than the selected routing information provided to the trusted router.

12. The computing device of claim 11, wherein the second router device is located in a hostile network and wherein the partial information includes only information relating to links between the trusted network and the hostile network.

13. The computing device of claim 11, wherein the first router device is located in a first country and wherein the second router device is located in a second country, and wherein the first country and the second country have a hostile relationship with respect to network security.

14. The computing device of claim 11, wherein the selected routing information includes a whole topology of the trusted network.

15. The computing device of claim 14, wherein, when determining that the second router device corresponds to an untrusted router, the processor is further configured to:

determine that a router record does not exist for the second router in a router database managed by the computing device.

16. The computing device of claim 11, wherein the selected routing information is further selected based on routing changes that occurred since a last time the first router device received routing updates.

17. The computing device of claim 11, wherein the policy associated with the first router device includes a particular policy associated with a particular routing information type.

18. The computing device of claim 17, wherein the particular policy includes at least one of:

an indication whether to accept or reject information associated with the particular routing information type;

an indication whether to accept or reject information associated with the particular routing information type based on a trust level of a router device that originated a message of the particular routing information type; or an indication how to transmit information associated with the particular routing information type.

19. The computing device of claim 11, wherein the policy associated with the first router device includes a particular policy associated with a particular multi-protocol label switching (MPL) label.

20. A non-transitory computer-readable memory device storing instructions executable by one or more processors, the non-transitory computer-readable memory device comprising:

one or more instructions to manage a routing table for a trusted network;

one or more instructions to receive a request for a first routing update from a first router device;

one or more instructions to determine that the first router device corresponds to a trusted router device;

one or more instructions to determine a policy associated with the first router device;

one or more instructions to select routing information based on the determined policy;

one or more instructions to provide the selected routing information to the first router device;

one or more instructions to receive a request for a second routing update from a second router device;

one or more instructions to determine that the second router device corresponds to an untrusted router; and one or more instructions to provide partial information from the routing table to the second router device, based on determining that the router device corresponds to an untrusted router, wherein the partial information corresponds to less information than the selected routing information provided to the trusted router.

* * * * *